INVENTOR
EUGENE E. HESTON

United States Patent Office  
3,422,493  
Patented Jan. 21, 1969

3,422,493  
ROTARY INDUCTION HEATED EXTRUSION DIE  
Eugene E. Heston, Akron, Ohio, assignor to NRM Corporation, Akron, Ohio, a corporation of Ohio  
Filed Aug. 26, 1966, Ser. No. 575,276  
U.S. Cl. 18—14                                              12 Claims  
Int. Cl. B29d 3/04

ABSTRACT OF THE DISCLOSURE

An extruder having a rotatable extrusion die at the extruder outlet and stationary heating means coaxially disposed with respect to the axis of rotation of the extrusion die to evenly heat the die during rotation thereof with respect to the heating means.

The present invention relates generally as indicated to a rotary induction heated extrusion die and more particularly to such die for production of blown film.

As known in the art of blowing plastic film, plasticized material is continuously extruded in tubular form through an annular slit defined between the mandrel and the shell of the die and wound up on a roll while air or the like under pressure in the tubular extrusion expands it in diameter from 1½ to 3½ times that of the die. It has been found that even if special care is taken to provide a uniform radial gap around the annular extrusion die slit, the gauge of the blown film may vary due, for example, to uneven heat distribution around the die. Aside from production of an inferior blown film, such varying gauge film will result in unevenly wrapped rolls thereof.

Accordingly, it is a principal object of this invention to provide a rotary extrusion die which, as it is rotated, provides for even heat distribution for production of a superior extruded product.

It is another object of this invention to provide a rotary extrusion die which results in evenly wrapped rolls of blown film.

It is another object of this invention to provide a rotary extrusion die which is heated by means of a surrounding stationary induction coil, thus obviating the necessity of slip rings and like components which otherwise would be required if the heating coil were mounted for rotation.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 1:
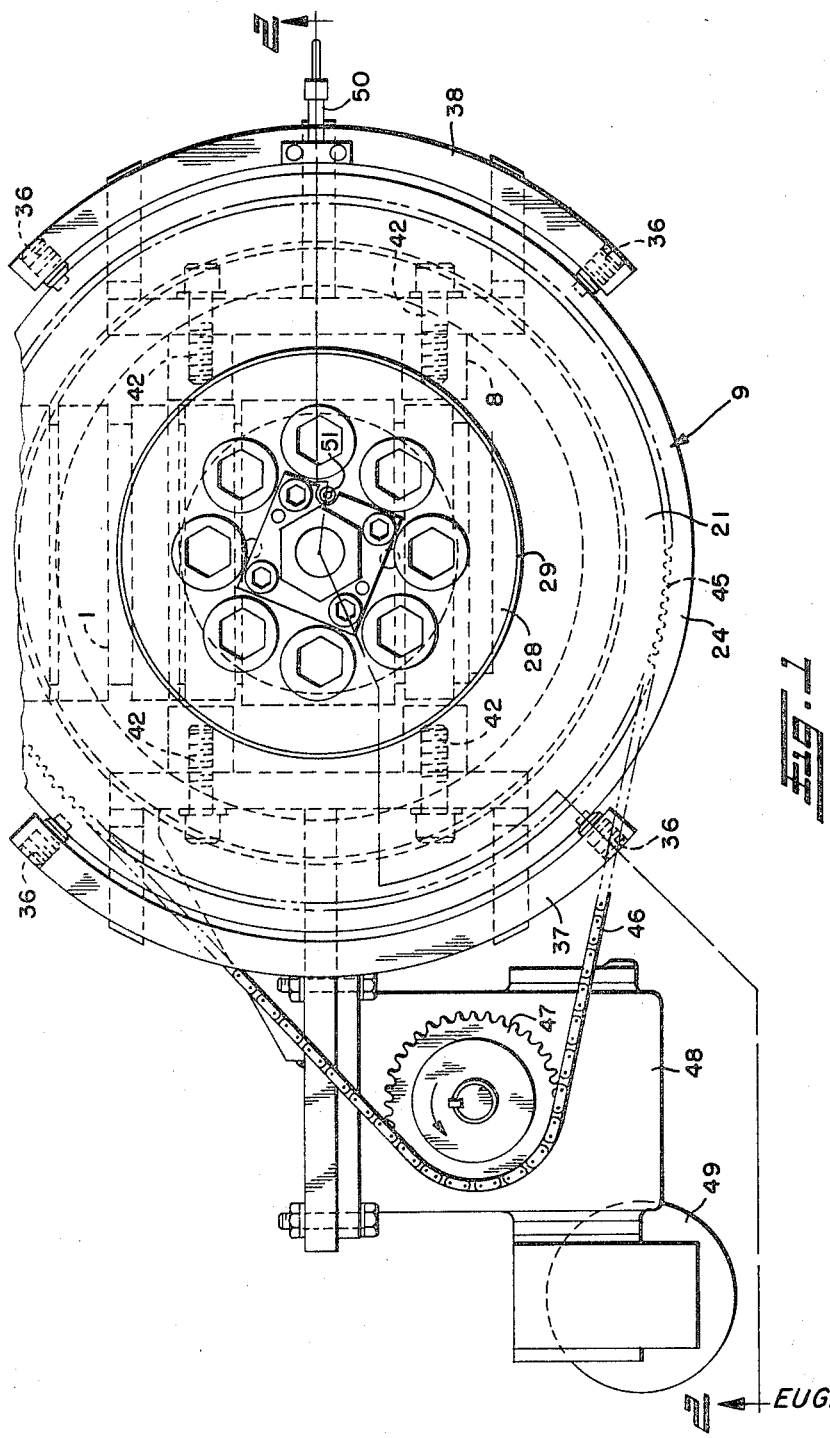
FIG. 1 is a top plan view of one embodiment of the present invention.

Referring now more particularly to the drawing, the reference numeral 1 denotes the barrel or cylinder assembly of an extruder having a bore 2 in which the feed screw 3 rotates to advance plastic material from an inlet opening at the right-hand end of the extruder (not shown) toward the left and upwardly through the outlet opening 4. The end of the barrel assembly 1 is sealed against leakage of plasticized material as by means of a packing follower 5 on the end of the feed screw 3 which compresses the packing rings 6 together to make sealed engagement with the feed screw 3 and with the liner 7.

Figure 2:
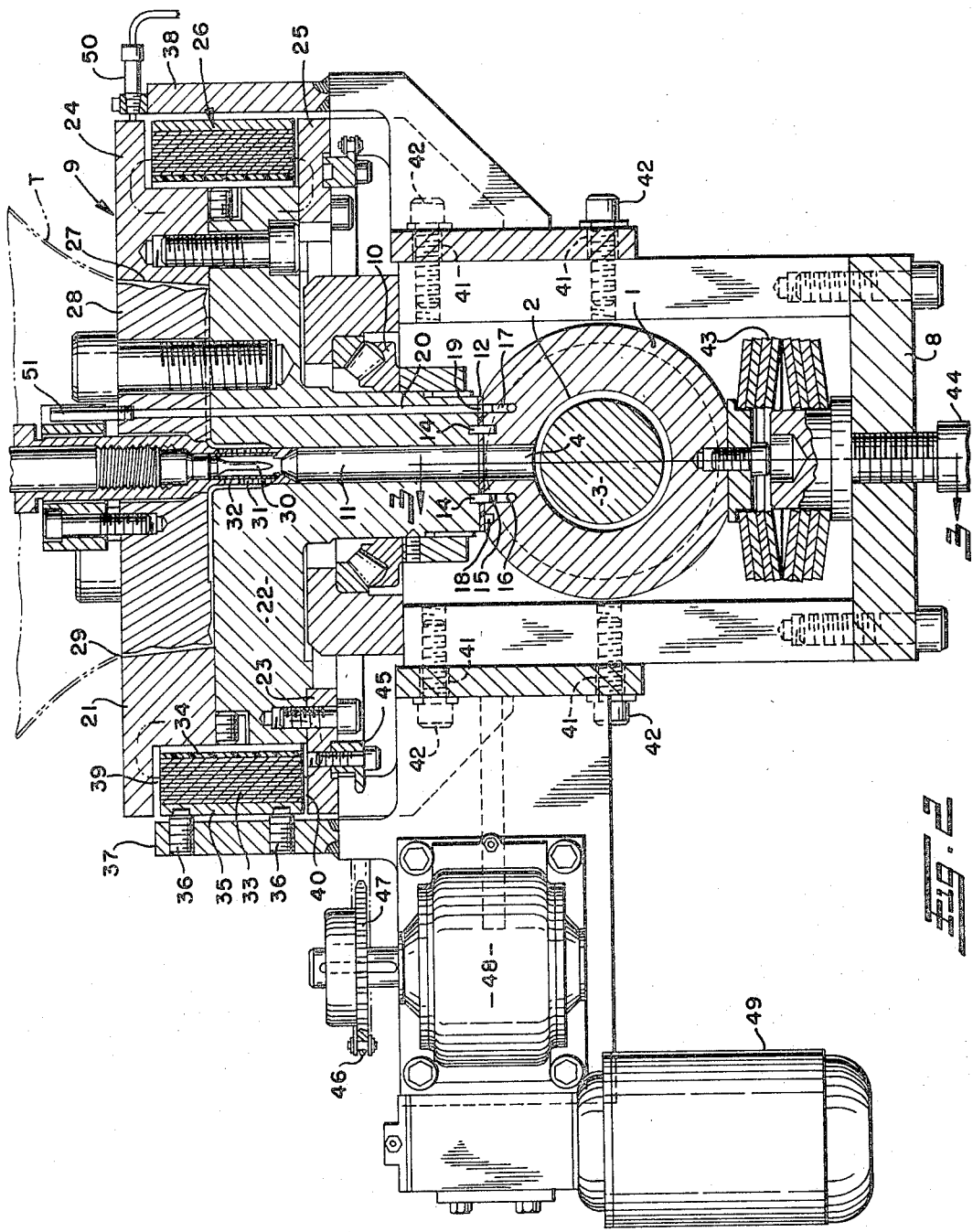
FIG. 2 is a cross-section view taken substantially along the line 2—2, FIG. 1.
Figure 4:
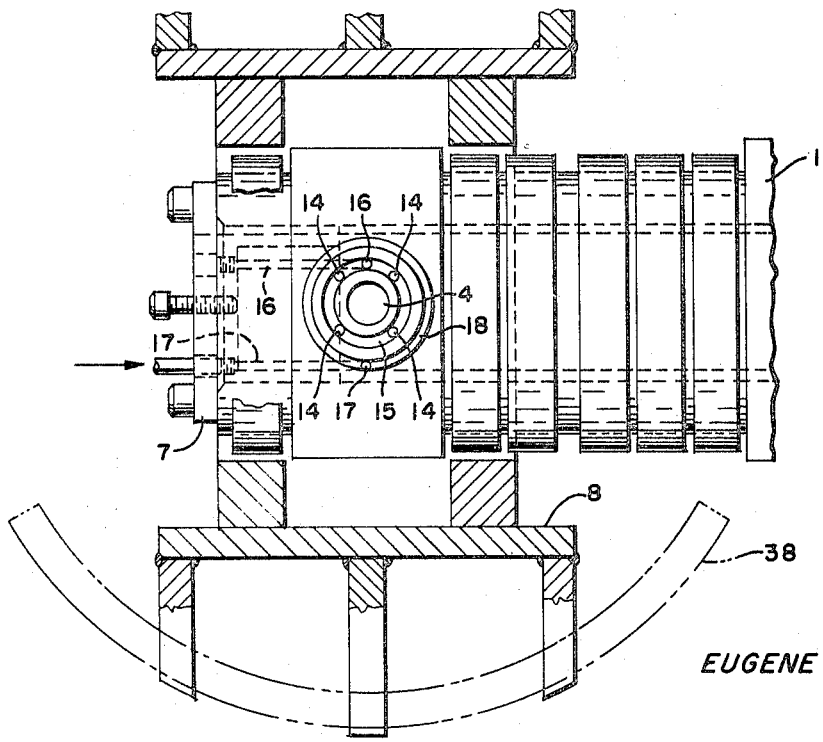
FIG. 4 is a cross-section view taken substantially along the line 4—4, FIG. 3.

At the outlet end of the extruder barrel 1 there is a die support base 8 on which the die assembly 9 is rotatably mounted as on the tapered roller bearing 10. The die assembly 9 has a central opening 11 which registers with the extruder outlet opening 4 and the rotary joint between the mating plane faces of the die assembly 9 and of the extruder barrel 1 are sealed as by a seal washer 12 composed of, for example, Teflon impregnated brass. The seal washer 12 is caused to rotate in unison with the die assembly 9 as by means of four pins 14 therein extending through corresponding holes in the seal washer 12 and extending into an inner annular groove 15 in the upper plane face of the barrel 1. As best shown in FIGS. 2 and 4 if there is any leakage of plastic material it will enter the annular groove 15 and flow out through the drain opening 16 so as not to block the flow of air through the air inlet passage 17 to the outer annular groove 18 in the extruder barrel 1 and thence from the annular groove 18 through registering openings 19 and 20 in the seal washer 12 and in the die assembly 9.

The die assembly 9 comprises a three-part body (parts 21, 22, and 23 bolted together) providing radially extending peripheral flanges 24 and 25 which straddle the fixedly mounted induction heating coil 26 to provide a flux path as shown by the dot-dash lines in FIG. 2. The upper body part 21 has a tapered bore 27 in which is bolted a core or mandrel 28 which defines with the tapered bore 27 an annular extrusion gap 29. Mounted centrally within the mandrel 28, and extending into the bore of the middle body part 22, is a spreader 30 and baffle 31 having a screen 32 to direct upward flow of plastic material radially through the openings of the baffle 31 and thence radially outward through the axis space between the bottom of the mandrel 28 and the upper face of the middle body part 22.

The induction heating coil 26 aforesaid is preferably made by spirally coiling metal foil or sheet material 33 around a core 34 and providing, around the outside, a flux guide 35. The induction heating coil 26 is engaged by screws 36 adjacent the ends of the arcuate coil support members 37 and 38 to enable accurate radial adjustment of the coil 26 coaxially with respect to the rotary die assembly 9. Furthermore adjustment for equalizing the air gaps 39 and 40 between the respective flanges 24 and 25 and the upper and lower ends of the coil 26 is provided by the clearance of the holes 41 with the screws 42 which mount the members 37 and 38 to the base 8.

Figure 3:
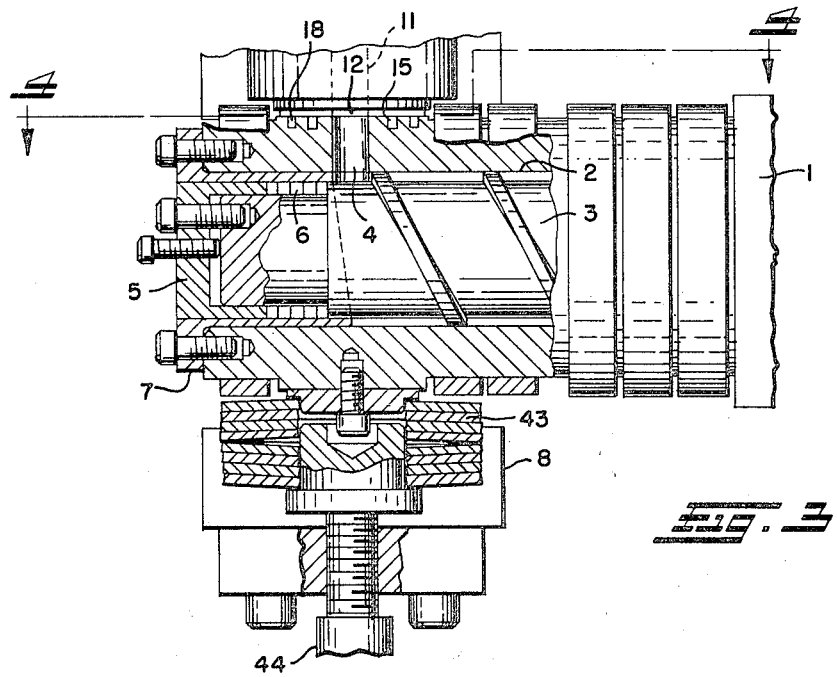
FIG. 3 is a cross-section view taken substantially along the line 3—3, FIG. 2.

The seal washer 12 aforesaid is preloaded by compacting the stack of Belleville springs 43 interposed between the barrel assembly 1 and the die support base 8. In FIG. 2 the Belleville springs 43 are shown in minimum preload position while in FIG. 3 the same have been deflected by screw 44 to apply greater preload on the seal washer 12.

The lower body part 23 of the die assembly 9 has bolted thereto a sprocket 45 which has a chain 46 therearound driven by the sprocket 47 on the output shaft of a speed reducer 48, the speed reducer 48 being driven as by the electric drive motor 49. In the present case the die assembly 9 is rotated very slowly, for example, about 1 r.p.m.

The coil support member 38 has mounted thereon a temperature sensing means 50 which has rubbing contact with the flange 24 of the upper body part 21. As will be apparent, the temperature sensing means need not have contact with the rotating die assembly 9 when it is a radiation or like sensor.

In operation, an air pressure source is connected to the air inlet passage 17 and as the feed screw 3 is turning, the plastic material will flow upwardly through the extruder outlet 4 and the opening 11 of the rotary die assembly 9 and through the openings of the baffle 31 and thence radially outward through the axial gap between the mandrel 28 and the middle body part 22 and axially upwardly through the annular passage between the mandrel 28 and the bore 27 of the upper body part 21 for extrusion in the form of a tube T. The upper end of the tube T (not shown) will pass between guide rolls, collapsers, and pinch rolls for wrapping onto takeup rolls. Air under pressure enters within the closed end tube T through the opening 20 and nozzle 51 to expand the tube T in diameter from 1½ to 3½ times that of the extrusion die gap 29.

By reason of the provision of a stationary induction coil 26 the heating of the die is uniform around the entire die assembly 9 and, in addition, the rotation of the die assembly 9 contributes even more to the even heating thereof thus to insure uniform viscosity of the extruded tube T for expansion to uniform gauge blown film. However, even if there is some minute variation in gauge of the blown film due, for example, to inaccuracy in the die, the slow rotation of the die assembly 9 will distribute the film on the takeup roll so that the wrapped roll will be cylindrical. Furthermore, the stationary heat source 26 eliminates the necessity of providing slip rings or the like since the electric supply cables may be connected directly to the stationary coil 26.

Other modes of applying the principle of the invention may be employed, change being made as regards the details described, provided the features stated in any of the following claims, or the equivalent of such, be employed.

I therefore particularly point out and distinctly claim as my invention:

1. In combination, an extruder having an outlet for plasticized material; an extrusion die at said outlet having a passage through which said material is extruded; means supporting said die for rotation with respect to said extruder; seal means between said extruder and die to seal the rotary joint therebetween; and stationary heating means coaxially disposed with respect to the axis for rotation of said die thus to evenly heat said die during rotation thereof with respect to said heating means.

2. The combination of claim 1 wherein said heating means comprises a circular induction heating coil surrounding said die; and wherein said die has radially extending flanges adjacent to the ends of said coil.

3. The combination of claim 1 wherein said seal means comprises an annular seal washer having an opening registering with said outlet and said passage.

4. The combination of claim 1 wherein said die passage at its exit end is in the form of an annular slit for extrusion of tubing; and wherein said die has another passage through which air enters within the extruded tubing to expand the same in diameter.

5. The combination of claim 1 wherein said heating means comprises a circular induction heating coil surrounding said die; wherein said die has radially extending flanges adjacent to the ends of said coil; and wherein means are provided for axially adjusting said coil between said flanges.

6. In combination, an extruder having a laterally extending outlet for plasticized material; a die support base having a bearing coaxial with said outlet; an extrusion die journalled in said bearing and having a passage registering with said outlet through which such material is extruded; drive means on said base for rotating said die; seal means between said extruder and die to seal the rotary joint therebetween; and stationary heating means on said base coaxially disposed with respect to the axis of rotation of said die thus to evenly heat said die during rotation thereof with respect to said heating.

7. The combination of claim 6 wherein adjustable preload means are disposed between said extruder and base to adjustably preload said seal means.

8. The combination of claim 6 wherein adjustable spring means are disposed between said extruder and base to adjustably preload said seal means.

9. The combination of claim 6 wherein said heating means comprises a circular induction heating coil surrounding said die; and wherein said die has radially extending flanges adjacent to the ends of said coil.

10. The combination of claim 6 wherein said seal means comprises an annular seal washer having an opening registering with said outlet and said passage.

11. The combination of claim 6 wherein said die passage at its exit end is in the form of an annular slit for extrusion of tubing; and wherein said die has another passage through which air enters within the extruded tubing to expand the same in diameter.

12. The combination of claim 6 wherein said heating means comprises a circular induction heating coil surrounding said die; wherein said die has radially extending flanges adjacent to the ends of said coil; and wherein means are provided for axially adjusting said coil between said flanges.

References Cited

UNITED STATES PATENTS

| | | | |
|---|---|---|---|
| 2,632,206 | 3/1953 | Pierce | 18—145 X |
| 3,020,588 | 2/1962 | Ferguson et al. | 18—145 X |
| 3,354,243 | 11/1967 | Dodge | 264—25 |

FOREIGN PATENTS

| | | |
|---|---|---|
| 1,268,578 | 6/1961 | France. |

WILBUR L. McBAY, *Primary Examiner.*

U.S. Cl. X.R.

264—25